E. J. PRINDLE.
LAST LATHE.
APPLICATION FILED MAY 7, 1904. RENEWED OCT. 24, 1911.

1,017,798.

Patented Feb. 20, 1912.

E. J. PRINDLE.
LAST LATHE.
APPLICATION FILED MAY 7, 1904. RENEWED OCT. 24, 1911.

1,017,798.

Patented Feb. 20, 1912.
7 SHEETS—SHEET 3.

E. J. PRINDLE.
LAST LATHE.
APPLICATION FILED MAY 7, 1904. RENEWED OCT. 24, 1911.

1,017,798.

Patented Feb. 20, 1912.

E. J. PRINDLE.
LAST LATHE.
APPLICATION FILED MAY 7, 1904. RENEWED OCT. 24, 1911.

1,017,798.

Patented Feb. 20, 1912.

UNITED STATES PATENT OFFICE.

EDWIN J. PRINDLE, OF WASHINGTON, DISTRICT OF COLUMBIA, ASSIGNOR, BY MESNE ASSIGNMENTS, TO UNITED SHOE MACHINERY COMPANY, OF PATERSON, NEW JERSEY, A CORPORATION OF NEW JERSEY.

LAST-LATHE.

1,017,798.        Specification of Letters Patent.        Patented Feb. 20, 1912.

Application filed May 7, 1904, Serial No. 206,945. Renewed October 24, 1911. Serial No. 656,488.

*To all whom it may concern:*

Be it known that I, EDWIN J. PRINDLE, of Washington, in the District of Columbia, have invented a certain new and useful Improvement in Last-Lathes, and do hereby declare that the following is a full, clear, and exact description thereof, reference being had to the accompanying drawings, in which—

Figs. 5 and 6 are longitudinal, sectional views of the chuck of the said lathe, which views show the parts of the chuck in different positions.

The object of my invention has been to provide a last turning lathe in which the chuck frame shall have great freedom of movement and shall move in a horizontal line, so that its weight does not have to be lifted to swing it, and so that its spindle will approach and recede from the model wheel and cutter along straight lines; which shall have an efficient chuck for holding last parts; which shall have improved means for reversing the motion of the spindles, so as to turn lasts the reverse of the model; and which shall have improved means for accurately measuring the girth of a last part, and to such ends, my invention consists in the last lathe hereinafter specified.

In carrying my invention into practice, I provide the usual bed A, supported upon legs $a$, the said bed having upon it a model wheel carriage B and a cutter carriage C, which are moved along guides on the carriage by any desired means. From the table rise side frames D and D that support, at their upper ends, a horizontal shaft E. Links F are hung from said shaft, and each supports one end, preferably the rearward end, of a lever G, each of the latter having its opposite end supported by a link H pivoted to the legs $a$ of the table. The links F and H are, preferably, of the same length, although they may be of different lengths, and the levers G support the chuck frame I by pivots connecting said parts, the pivots being in the centers of the levers G, when the links F and H are of the same length; but, in any case, said pivots are positioned at the point on the lever G which travels in a horizontal straight line when the linkage is swung. This results in the chuck frame traveling only along horizontal lines, so that its weight does not have to be lifted as in the case of last lathes in which the side bars of the chuck frame are pivoted from above or below, so that the chuck frame travels in the arc of a circle.

The chuck frame is provided with headstock and tail-stock spindles, and gearing for driving them. In order to prevent the chuck frame from moving in the direction of its length, links K and K' are pivoted at their outer ends to the frame of the lathe, and their inner ends are connected by a lever $K^2$ whose middle point is pivoted to the chuck frame, preferably to its upper bar. The levers K and K', being of equal length, the middle point of the lever $K^2$ will travel in a straight line forward and backward, and all yielding in the direction of the length of the chuck frame will be prevented. In order to keep the chuck frame upright in a vertical position, the side bars $i$ and $i'$ thereof are extended upward above the upper guide-bar $i^2$, and they are connected by the upper horizontal bar $i^3$. Four bars $i^4$ are connected to the upper portions of the chuck frame, and unite upon a slide L, mounted in a guideway on the rear of the machine. The bars $i^4$, being connected with the slide L, permit the movement of the swing frame, and yet they prevent its tipping upon the pivots connecting it with the levers G. The spindles M and M' on the swing frame for holding the model N and the block O are formed with chucks, as illustrated in Figs. 5 to 12, the said chucks being adapted to support a toe-part of a last or a block for forming such a last part, which is provided with a plane rear surface $p$, in which are set four screws $p'$ having their heads standing at some distance from the surface $p$, as indicated in dotted lines in Figs. 5 and 6. The surface $p$ is inclined to the horizontal lines of the last, and the chuck is adapted to hold the last so that its horizontal lines shall be parallel to the axis of the spindle, and, therefore, the face plate $q$ of the chuck Q is inclined to the said axis. The said face plate is secured, as by screws, to the chuck head $q'$. Four plugs $q^2$ occupy holes in the face plate, the said holes being in such position that the plugs are in the proper relative positions to engage the screws $p'$. Each plug is provided with a laterally opening recess $q^3$ that is adapted to receive the head of the screws, the recesses being undercut so as to fit over the screw head and to fit around the screw shank. Each plug has a shank $q^4$ that is received in a cylindrical bearing in the chuck head. Each shank is provided with a spiral groove $q^5$ that is engaged by a pin $q^6$ on a plate $q^7$, the said plate having a shank $q^8$ that is pivoted to a rod $q^9$, the latter extending through a central hole in the spindle, and being engaged at its rear end by a hand-wheel $q^{10}$ that is swiveled on the rear end of the spindle, as by having a flange $q^{11}$ formed on its shank which flange is engaged by a collar $q^{12}$ screwed on the spindle. The plate $q^7$ partly embraces the shanks of the plugs, and the said shanks are provided with collars $q^{13}$, against which the plate can bear when it has reached the rear ends of the spiral slots. The stems $q^4$ of the plugs are half cut away to form semi-circular bearing surfaces $q^{14}$, and half round plugs $q^{15}$ are seated in the rear ends of the bearings in the chuck head. Shoulders or collars $q^{16}$ are formed on the plugs, if desired, to engage the rear surface of the face plate and prevent the plugs from extending too far beyond the face plate.

Figure 5:
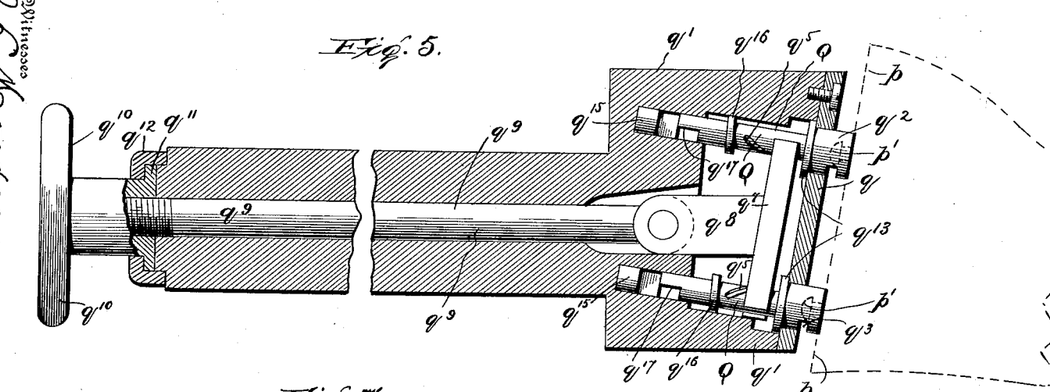
Figure 7:
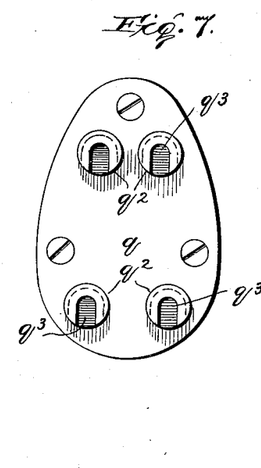
Figs. 7 and 8 are views of the face of the chuck of Figs. 5 and 6.
Figure 8:
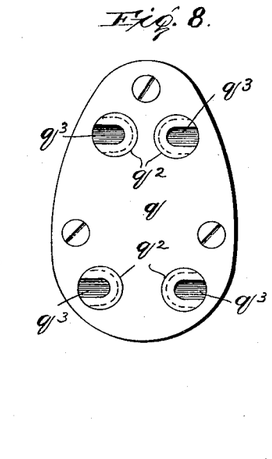
Figure 9:
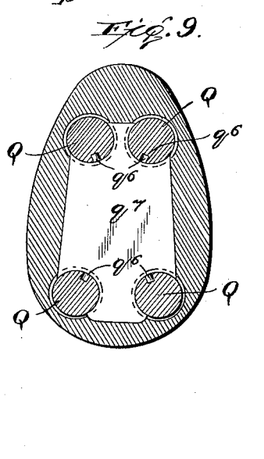
Fig. 9 is a sectional view taken on the line 9—9 of Fig. 5.
Figures 9, 10, 11, 12:
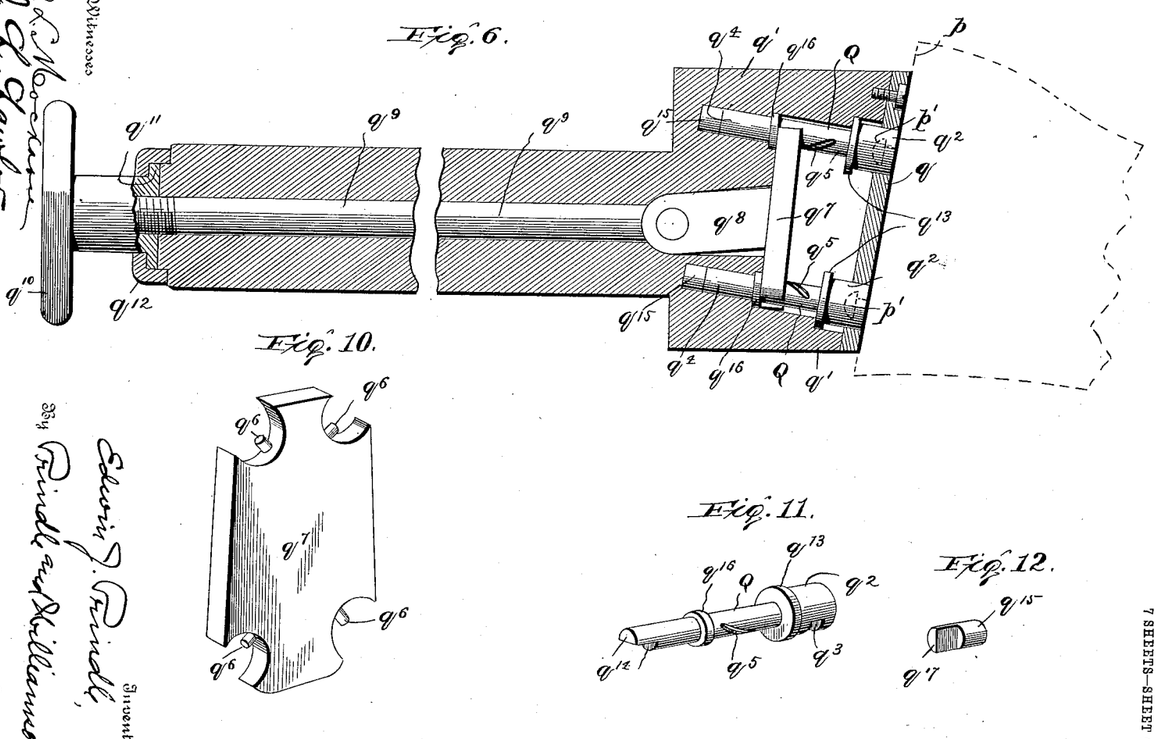
Figs. 10, 11 and 12 are perspective, detail views of parts of the said chuck.

In the operation of the chucks, the plugs are extended beyond the face plate, as illustrated in Fig. 5, and their recesses $q^3$ all open in the same direction, preferably downward. The screws on the last part or block are then passed into the undercut recesses, and the hand-wheel is turned, drawing the rod and the plate $q^7$ rearward. In the initial position of the plugs, the half-round surface $q^{14}$ on the end of each of their stems rests upon the half round surfaces $q^{17}$ on the plugs $q^{15}$, and rearward movement of the plugs $q^2$ is thereby prevented. The pins $q^6$ will, therefore, travel rearward through the spiral grooves $q^5$ and rotate the plugs $q^2$ without drawing them rearward, until the half-round surfaces $q^{14}$ have turned off from the half-round surfaces $q^{17}$, in which position the undercut recesses in the plugs $q^2$ will have turned away from each other, so as to prevent the escape of the screw heads from the plugs. Further movement of the screw-rod will draw the plate $q^7$ against the collars $q^{13}$ on the plug stems, and will cause the plugs to withdraw into the face plate and finally to draw the surface $p$ on the block or model with great firmness against the face plate. Movement of the hand-wheel in the opposite direction will cause the plugs to be first thrust forward through the face plate, and then turned to the position illustrated in Fig. 7, so that the undercut recesses all open in the same direction and the screws can be removed. I have found in actual practice that the chuck just described is an exceedingly efficient one, and one which is operated readily and rapidly.

Figure 13:
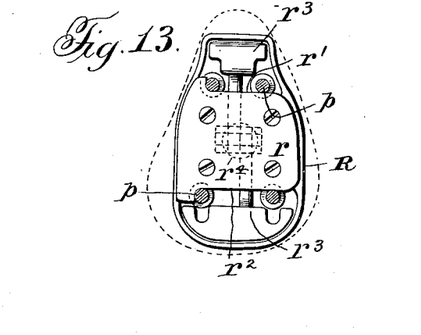
Figs. 13, 14 and 15 are, respectively, face, side and longitudinal sectional views of an alternative construction of chuck.
Figure 14:
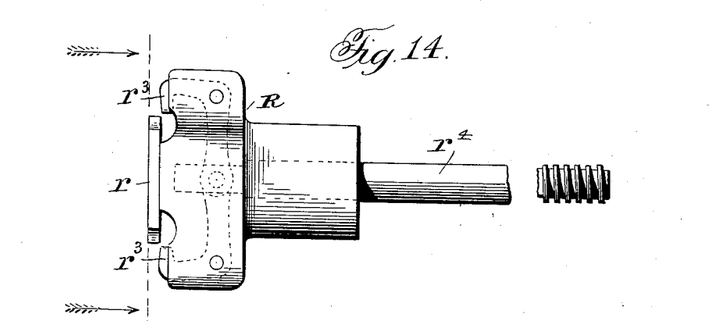
Figure 15:
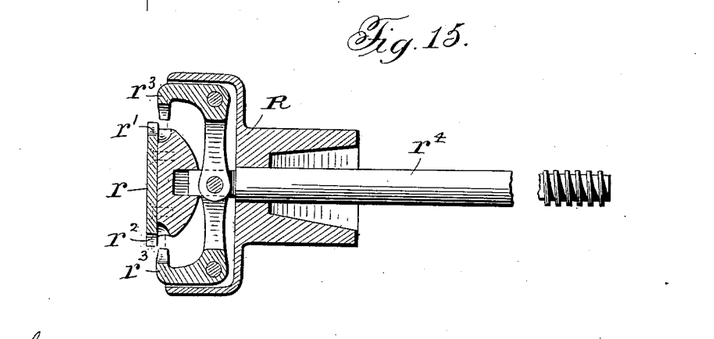

An alternative form of chuck is that illustrated in Figs. 13, 14 and 15, in which the head R is provided with a face-plate $r$, whose upper and lower edges $r'$ and $r^2$ are parallel, and, formed the proper distance apart, to snugly fit between the shanks of the upper and lower screws $p$ on the last or block to be turned. At one end of each of the edges $r'$ and $r^2$, a shoulder is formed to receive one of the said screws and properly position the last part laterally. Within a recess in the head are pivoted jaws $r^3$, the jaws being of such shape as to fit between or around the shanks of the screws adjacent thereto and to crowd them against the shoulders on the edges $r'$ and $r^2$ of the face-plate. A screw-rod $r^4$ is pivoted to the shanks of the jaws, and is operated by a hand-wheel, as in the form previously described. When the screw-rod $r^4$ is drawn rearward, the jaws close down around the screw shanks, and when such rod is moved forward, the jaws open and permit the screw shanks to pass. The jaws may be made wedge-shaped, so that as they pass behind the screw heads, they will draw them rearward, and draw the block against the face-plate.

Figure 19:
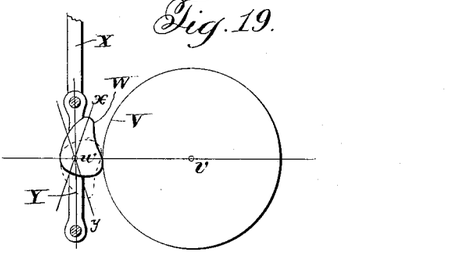

The lathe spindles M and M' are respectively, provided with gears $m$ and $m'$, which mesh with pinions, by which they are driven, the gear $m'$ being driven by a pinion $m^2$ on a shaft $m^3$. The gear $m$ is driven either by a pinion $m^4$ splined upon the shaft $m^3$, or by a double-width pinion $m^5$ meshing with the pinion $m^4$, the said pinions being shiftable, so that the spindle M can be driven either in the same direction as the spindle M', when the last turned will be of the same kind as the model; that is, be a right last, if the model is a right last; or the spindle M can be driven in the opposite direction to the spindle M', when the last turned will be the reverse of the model; that is, will be a left last if the model is a right last, and vice versa. If the gearing for revolving the chuck-spindles of the above-described lathe be shifted to reverse the movement of said spindles at any period of their rotation, they will, of course, turn a foot-shape contour on a reverse last, which is the reverse of that of the model. It has, however, heretofore, been a very difficult matter to cause the hinges with their jack-pin sockets in the reverse last to occupy precisely the same relation to the sole, for instance, as they occupy in the model. For instance, if the top of the heel of the model be narrow, so that there is only just sufficient width to receive the jack-pin socket, when a reverse last is turned from a model, it is not only desirable, but necessary, not only to get the foot-shape contour of the reverse last exactly the reverse of the model, but it is necessary to position the jack-pin socket so that it will be wholly confined within the narrow top of the heel, and will not cut into the foot-shape contour on either side of the heel. Prior to my invention, it has been customary, when turning a reverse last part, to empirically shift the work-chuck relative to the model-chuck, or vice versa, until the jack-pin socket has been made to come into the desired position. I provide a bolt $m^6$ and a hole in the gear $m$, so that when the said bolt is engaged in the said hole, a line passing through the chuck, midway between each of the two pairs of plugs, the upper and lower pairs will also pass through the center of rotation of the model-wheel and of the cutter-head. If, when the chucks are in this position, pinions $m^4$ and $m^5$ are set to cause the chucks to revolve in opposite directions, it will be found that the median line $m^7$—$m^7$ between the two pairs of plugs of the one chuck will bear precisely the same relation to the foot-shape contour of the model as such median line of the other chuck bears to the foot-shape contour of the last being turned, and thus, when the new last is assembled, the toe-part and heel-part will be found to fit together perfectly, and the jack pin socket and other metal parts of the new last will be found to have the same relation to the sole, cone and other parts of the last as they do in the model. The reason for this is, that the lathe in turning a reverse last always forms the new last Y (see Fig. 19) symmetrical to the model W about a line $w$—$v$ passing through the axes of revolution $v$ of the model wheel V or cutter and that of the chucks as axes of symmetry, and my mechanism for reversing the motion of the spindles by causing such reversal to begin when the median lines of the chucks are coincident with said axis of symmetry also causes the screws or other hinge-attaching means or surfaces in the model and last being formed to be symmetrical about the same axis of symmetry. This method of reversing a last lathe is the subject of an application for patent filed of even date herewith.

The grading mechanism for width and length illustrated in the drawings of the present application is the subject of an application for patent filed by me July 26th, 1902, Ser. No. 117,183.

The broad idea of a chuck for a last part having a face plate and means for drawing said last part against said face-plate is the subject of an application filed by me August 14, 1901, Serial No. 72,081.

The method of turning a last or last part by first forming a predetermined surface and afterward forming the foot shape contour, and also the method of turning the extremity of the last part by supporting said part by one end only, so as to leave the extremity exposed and then operating upon it by a cutter guided from the model is the subject of an application filed by me the 6th day of June, 1900, Serial No. 19,293.

Figure 1:
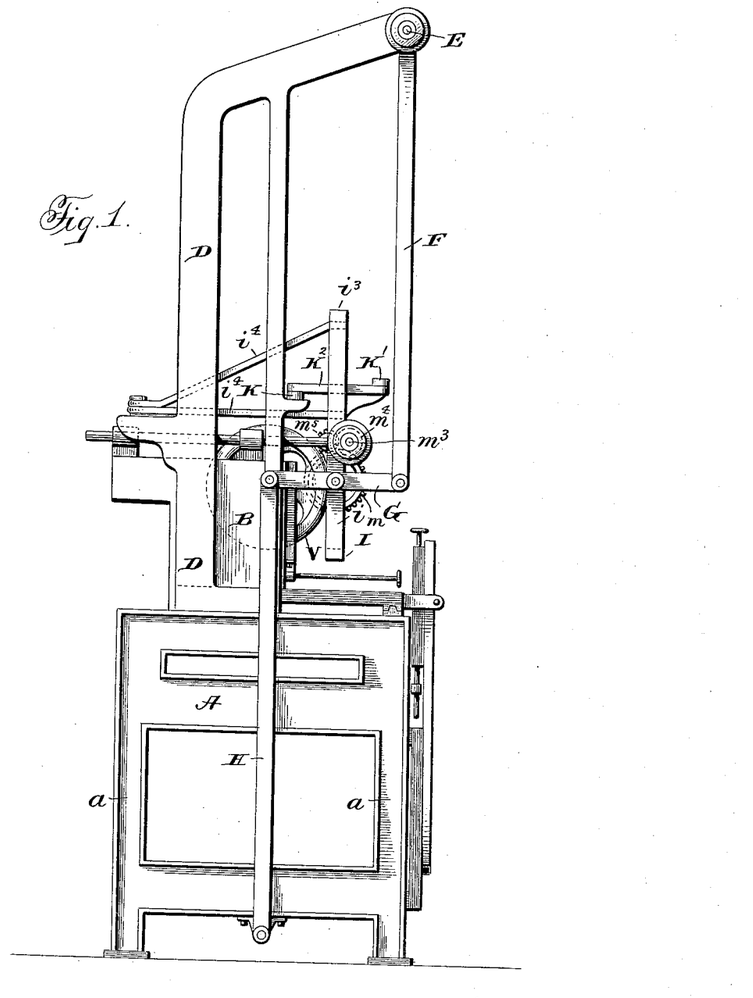
Figure 1 is a side elevation of a lathe embodying my invention.
Figure 2:
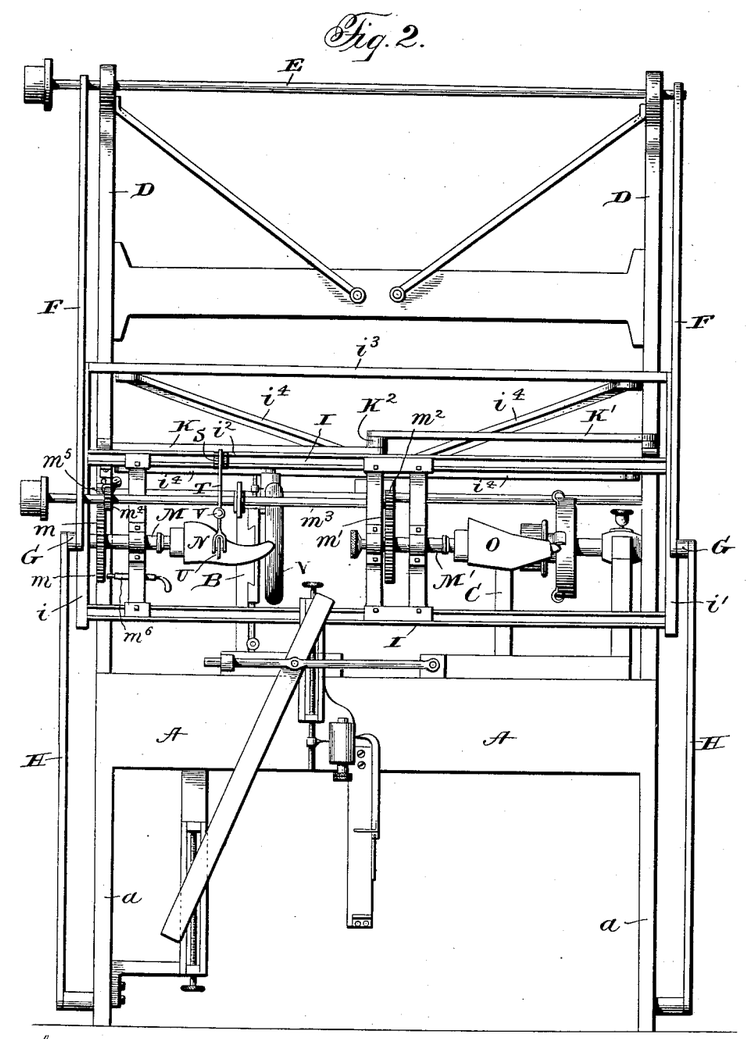
Figs. 2 and 3 are, respectively, a front view and a horizontal sectional view taken on a plane above the level of the frame 1.
Figure 3:
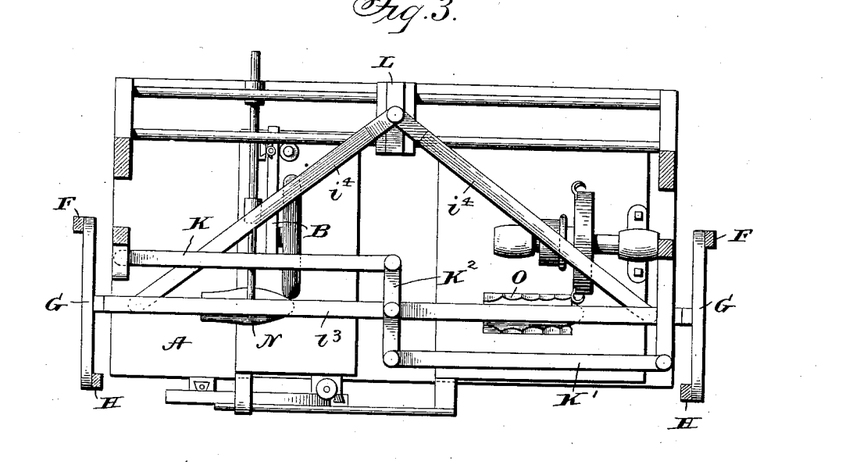
Figure 4:
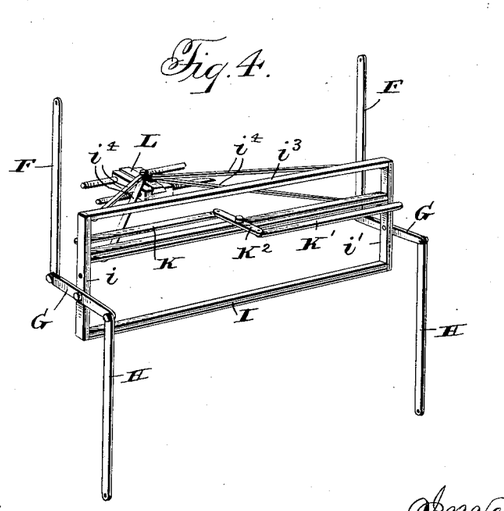
Fig. 4 is a perspective view of the swing frame and its supporting and guiding means.
Figures 16, 17, 18:
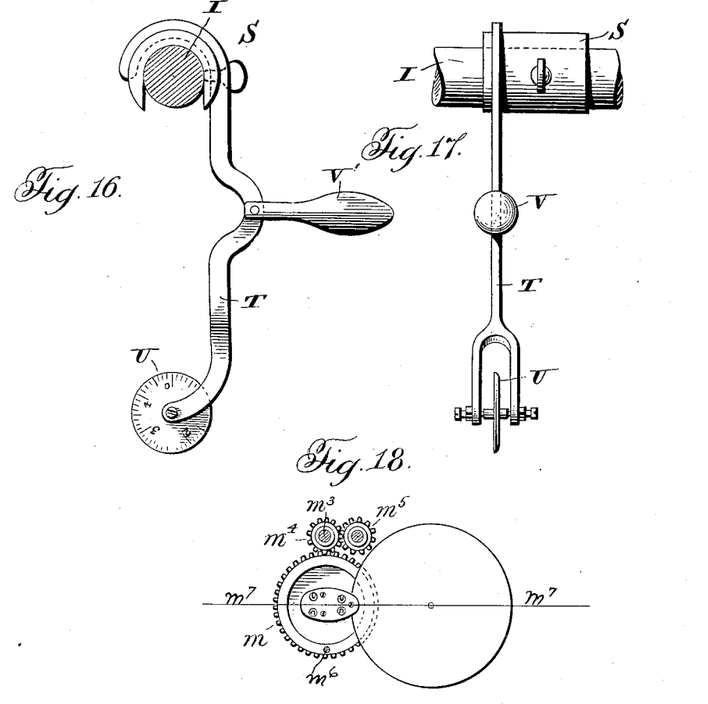
Figs. 16 and 17 are, respectively, side and end views of my measuring device.
Fig. 18 is a fragmentary view of the lathe, showing the apparatus for reversing; and, Fig. 19 is a diagrammatic view, illustrating the theory of the apparatus for reversing.

It has heretofore been extremely difficult to measure the girth of lasts, the results obtained by any two different persons frequently being different, and the results obtained by the same person at different times frequently being different. To overcome such difficulties, I have invented the measuring device illustrated in Figs. 2, 17 and 18. Such device consists, as illustrated, of a partial sleeve S, which can be fitted over the guide rod of the swing frame, such sleeve being provided with a thumb screw for securing it in position upon said guide rod, and also being provided with a groove extending in the plane perpendicular to the axis of revolution of the lathe spindles. A lever T is provided with a hook at its upper end to snugly fit in the said groove, the fit not being tight enough to interfere with free movement of the said hook in the said groove. The lower end of the lever is forked, and a measuring disk U is journaled between the arms of said fork. The said disk is graduated around its periphery so as to indicate the number of inches of circumference. A handle V' is attached to the lever, for convenience in handling the latter. In using the above-described measuring device, the sleeve is positioned on the guide rod so that the measuring disk touches the last or last part at the point where it is desired to measure its girth. A mark is made upon such last part, and zero of the disk is set at the said mark. The lathe spindle is then slowly revolved and the disk travels around the last, and when the mark again comes under the disk the girth of the last can be accurately read from the disk. In order to insure that the model and last shall be measured at the same point, it is convenient to form a slight projection on the model, as by driving a tack into it at the point where the measurement is to be taken. The lathe in forming the last will reproduce the projection at the true point in the last corresponding to the projection in the model, and the said reproduced projection can be used for positioning the measuring disk in measuring the last. If desired, some point on the model carriage can be set at the point on the model where the measurement is to be made, and a corresponding point on the cutter carriage will indicate the point on the last where the measurement is to be made.

Having thus described my invention, what I claim is:—

1. In a last lathe, the combination of a model wheel and cutter, a chuck frame, links pivoted upon the chuck frame, links pivoted below the chuck frame, and levers connecting the free ends of said links, said levers being pivoted to the chuck frame, said links and the respective lever-arms being so proportioned as to insure straight-line movements of the center pivots.

2. In a last lathe, the combination of a model wheel and cutter, a chuck frame, a link pivoted at one side of the frame of the machine, a link pivoted at the opposite side of such frame, and a lever connecting the free ends of said links, said lever being pivoted to said chuck frame said links and the respective lever-arms being so proportioned as to insure straight-line movements of the center pivots.

3. In a last lathe, the combination of a model wheel and cutter, a chuck frame, a link pivoted at one side of the frame of the machine, a link pivoted at the opposite side of such frame, and a lever connecting the free ends of said links, said lever being pivoted to said chuck frame, said links being of equal length, and the point of connection between said lever and said chuck frame being at the middle of the link.

4. In a last lathe, the combination of a model wheel and cutter, a chuck frame, links pivoted to the ends of said chuck frame for guiding the latter toward and from the model wheel and cutter, means for preventing the rotation of said chuck frame about said pivots and linkages for preventing movement of said chuck frame in the direction of its length.

5. In a last lathe, the combination of a model wheel and cutter, a chuck frame, links pivoted to the ends of said chuck frame for guiding the latter toward and from the model wheel and cutter, means for preventing the rotation of said chuck frame about said pivots, said means consisting of braces attached to said chuck frame and connected with a horizontally movable part and linkages for preventing movement of said chuck frame in the direction of its length.

6. In a last lathe, the combination of a model wheel and cutter, a chuck frame, links pivoted to the ends of said chuck frame for guiding the latter toward and from the model wheel and cutter, means for preventing the rotation of said chuck frame about said pivots, said means consisting of braces attached to said chuck frame and connected with a horizontally movable slide and linkages for preventing movement of said chuck frame in the direction of its length.

7. In a last lathe, the combination of a chuck frame having upper and lower guide bars and having model and block chucks mounted in said frame parallel to said guide bars, a sleeve mounted upon the upper guide bar and provided with a transverse groove, said sleeve being open on one side, so that it can be set on or lifted off of said guide bar, a lever having a hook adapted to engage said groove and a graduated disk at the free end of said lever, said lever being weighted to cause said disk to normally rest against a last mounted upon the chucks to measure its girth.

In testimony that I claim the foregoing I have hereunto set my hand.

EDWIN J. PRINDLE.

Witnesses:
JOSEPHINE L. LAWLOR,
KATHERINE E. LAWLOR.

Copies of this patent may be obtained for five cents each, by addressing the "Commissioner of Patents, Washington, D. C."